E. M. ADAMS.
VALVE FOR SODA FOUNTAINS.
APPLICATION FILED FEB. 4, 1918.
1,274,362.
Patented Aug. 6, 1918.
2 SHEETS—SHEET 1.
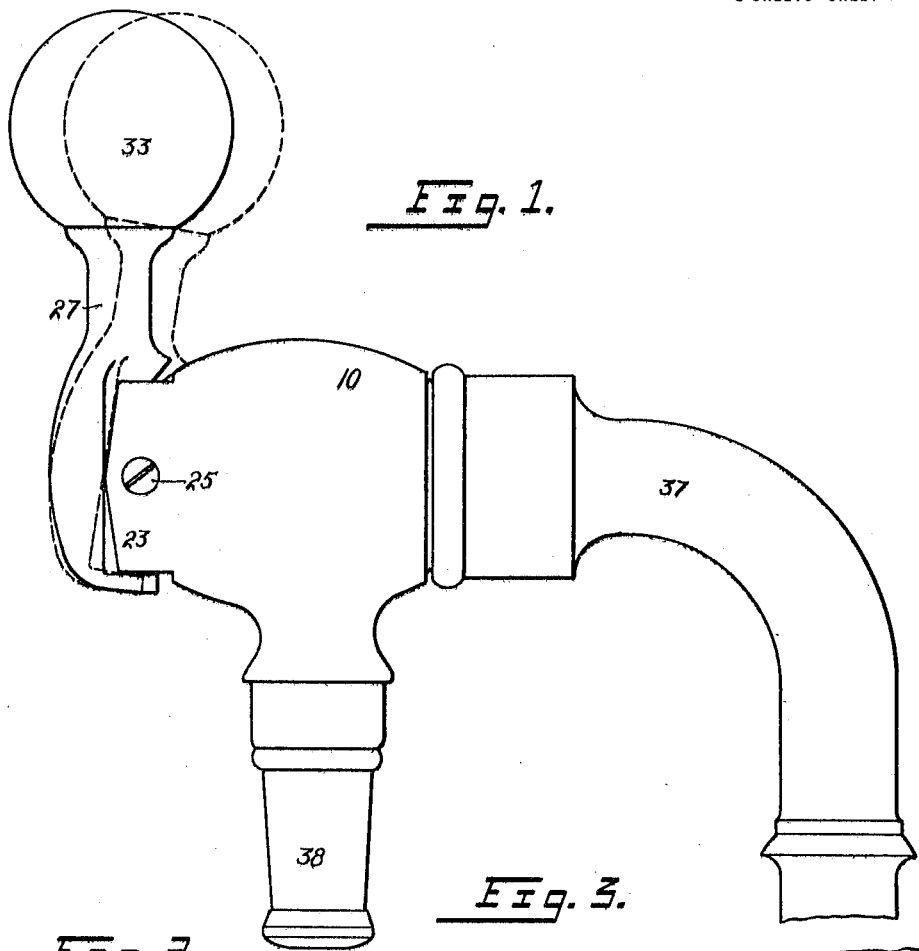
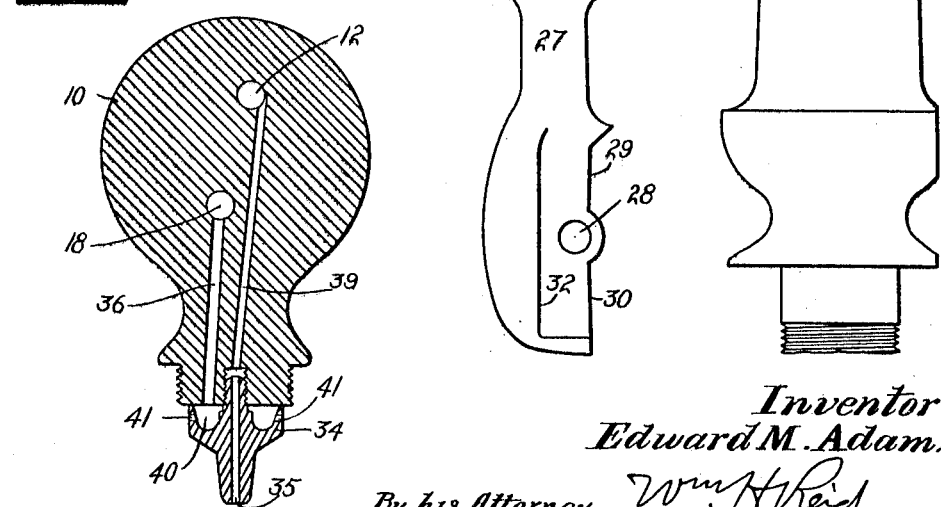
Inventor:
Edward M. Adams,
By his Attorney E. M. ADAMS.
VALVE FOR SODA FOUNTAINS.
APPLICATION FILED FEB. 4, 1918.
1,274,362.
Patented Aug. 6, 1918.
2 SHEETS—SHEET 2.
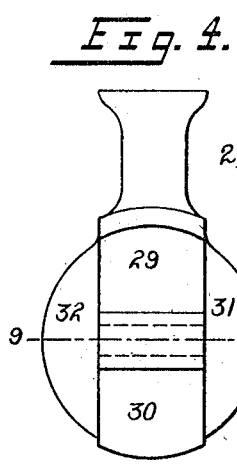
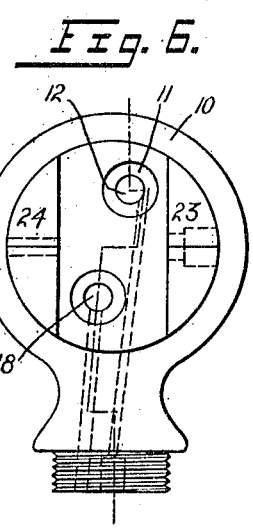
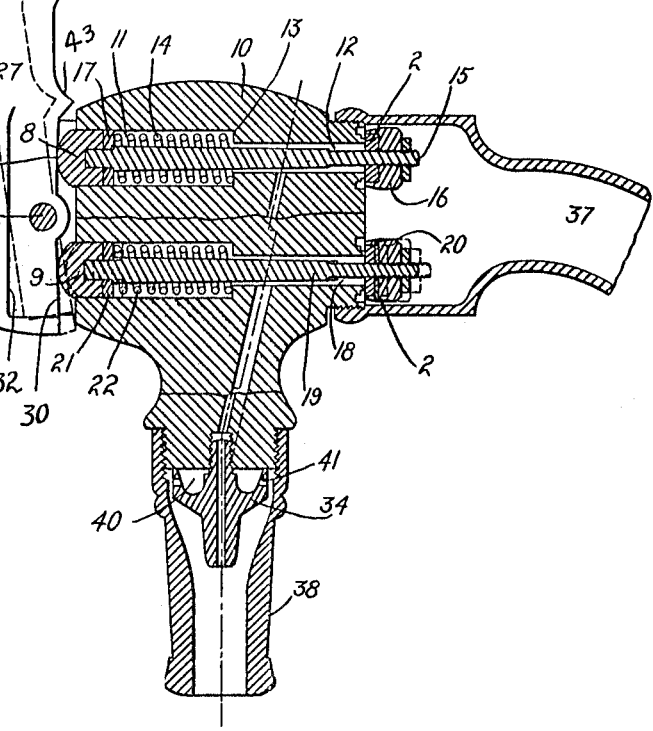
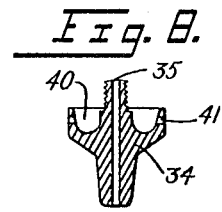
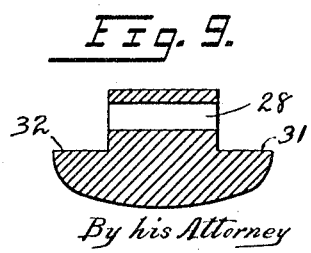
Inventor:
Edward M. Adams,
By his Attorney  Wm. H. Reid.

UNITED STATES PATENT OFFICE.

EDWARD M. ADAMS, OF NEW YORK, N. Y., ASSIGNOR TO MORRIS H. PETIGOR, OF NEW YORK, N. Y.

VALVE FOR SODA-FOUNTAINS.

1,274,362.　　　　　Specification of Letters Patent.　　Patented Aug. 6, 1918.

Application filed February 4, 1918.　Serial No. 215,268.

*To all whom it may concern:*

Be it known that I, EDWARD M. ADAMS, a citizen of the United States, residing at New York, county and State of New York, have invented certain new and useful Improvements in Valves for Soda-Fountains, of which the following is a specification.

The object of the present invention is to provide an arrangement of the lever and valves in a soda water valve device in which the lever will engage the valve stems so as to cause a thrust in an axial direction of the stems, to effect a positive and quick action of the valve, and with a short swing of the lever; and also in which the lever will swing an equal distance in each direction from the normal position, for each valve movement.

A further object is to provide a head or thimble on the end of the valve stem, that upon removal of the lever will permit the head to slide off and be quickly replaced, when so worn as to not give the proper lift to the valve. Another object is to provide a special form of valve body with side ears to receive the lever therebetween, that will protect the valves from dust and injury.

In the accompanying drawings showing one embodiment of my invention, Fig. 1 is a side elevation. Fig. 2 is a section of Fig. 1. Fig. 3 shows a side elevation of the lever. Fig. 4 is an inner face view of the lever. Fig. 5 is an axial section of the device. Fig. 6 shows an end elevation of the body member. Fig. 7 shows the discharge nipple. Fig. 8 is a section of the nipple; and Fig. 9 is a cross section of the lever on the line 9—9 of Fig. 4.

The body 10 is provided with a bore 11 having a reduced part 12 forming a shoulder 13, to receive the end of a coil spring 14 that surrounds the valve stem 15, slidable in the bore 11. The stem 15 projects beyond the body and carries a valve 16 that is pressed against the valve seat on the body end by the spring 14; which spring engages a collar 17 fast on the valve stem. A duplicate of this valve is provided that slides in a bore 18 in the body, such valve comprising stem 19, valve 20, collar 21 and spring 22.

On the front of the body are a pair of ears 23, 24, on opposite sides of the vertical bores 11 and 18; that are almost in a vertical plane; which ears are apertured to receive a pivot bolt 25. A lever 27 has a bore 28 to receive and swing on the bolt between the ears, and the lever is provided with abutment faces 29 and 30 above and below the pivot bolt in line therewith as shown. The valve stems 15 and 19 are provided with heads or thimbles 8 and 9 that slide loosely on the end portions of the stems, beyond the collars 17 and 21; and have rounded ends that engage the said faces 29 and 30 respectively in the normal positions of the parts, as shown in Fig. 5. The lever also has side ears 31 and 32, that extend across the ears 23, 24 respectively; and at the top the lever has a knob 33 secured thereto.

At the lower part of the valve body is secured a discharge controlling nipple 34, whose central bore 35 registers with the bore 39 leading down from the upper valve bore 11. The soda water under considerable pressure enters by pipe 37, that is attached to surround the rear end of the body containing the valve seats. When the valve 16 is raised, by moving the lever forward as indicated in Fig. 1, the water will enter the bore 11 and pass down through bore 39 and through nipple 34, to find exit through the large nozzle 38 surrounding the nipple 34.

On drawing the lever forward, as indicated in Fig. 5, the valve 20, will be lifted and the water will enter the bore 18 and pass down through a bore 36 in the body, to enter an annular chamber 40 at the top of the nipple 34; see Fig. 2. This chamber has several side openings 41, to permit the water to pass out into the nozzle bore and down through the same in a large stream with the pressure much reduced from the direct stream through the middle of the nipple.

With the construction as set forth the valve heads will be engaged by the faces of the lever, that coincide with the pivot bolt, and the thrust on the valve stem will be about in line with the axis of the stem; so that a small and easy swing in either direction of the lever will lift the valve to furnish the stream desired, and an equal amount of movement in each instance. When the lever is drawn forward the lower valve is lifted and a direct stream produced. The lever will swing until it engages the front face of the body by its face 30 at the lower part, that will limit the swing of the lever, and prevent undue pressure on the valve spring. On swinging the lever rearward the valve 16 is lifted until the face 29 of the lever strikes the upper part of the body front face, to arrest the lever and protect the valve spring.

The side ears 23 and 24 on the body, and the ears 31 and 32 on the lever serve to protect the valves from dust and injury. The lever is shown as having a lip 43 projecting back over the front face of the body to prevent particles falling down on the valve stems. If the heads 8 and 9 become worn from use, the lever is removed by withdrawing the bolt 25, when the heads can be simply drawn out and replaced, as they slide loose on the stems to engage the collars and are prevented by the lever from falling off.

What I claim is:—

1. A double valve for beverage dispensing, comprising a body having a pair of relatively superposed bores, a spring-closed valve normally closing the inner end of each bore and having a stem slidable therethrough and projecting beyond the outer end of the bore, said body having a pair of ears disposed on opposite sides of the projecting valve stems and extending above and below the upper and lower stems, respectively, to inclose the same, the outer edge of each ear inclining at both ends toward the body from a central point, said ears further being perforated adjacent said central point, and a lever pivoted between said ears in their perforations and formed with oppositely projecting ears overextending the ears of the body and normally engaging the central points of said body ears, said lever ears engaging the latter for limiting the swinging movement of the lever.

2. In a double valve for beverage dispensing, a body having a pair of parallel bores, a valve stem slidable in each bore, a spring to keep each valve normally seated, a pair of spaced apertured ears on the body substantially parallel with the plane of the bores and each ear provided with oppositely beveled edges, a lever hinged between said ears to swing on an axis substantially perpendicular to the plane of the bores and between the valve stems and normally engaging the stems, whereby on swinging the lever in one direction one valve is lifted and on swinging the lever in the other direction the other valve is lifted, the lever being arranged to engage the body between the ears and the respective beveled edges of said ears to arrest its swing in both directions to limit the lifting of the valves.

Signed at New York city, N. Y., on January 23, 1918.

EDWARD M. ADAMS.

Copies of this patent may be obtained for five cents each, by addressing the "Commissioner of Patents, Washington, D. C."